United States Patent [19]
Downing

[11] 3,866,576
[45] Feb. 18, 1975

[54] SMALL ANIMAL AND POULTRY FEEDER

[75] Inventor: George W. Downing, Lake Geneva, Wis.

[73] Assignee: Lake Geneva Metal Spinning Company, Inc., Fort Atkinson, Wis.

[22] Filed: Oct. 3, 1973

[21] Appl. No.: 402,984

[52] U.S. Cl. .............................. 119/18, 119/52 R
[51] Int. Cl. ............................................. A01k 5/00
[58] Field of Search ............ 119/18, 51 R, 52 R, 53

[56] References Cited
UNITED STATES PATENTS

| | | | |
|---|---|---|---|
| 1,020,790 | 3/1912 | Baker | 119/53 |
| 1,025,225 | 5/1912 | Wilson | 119/53 |
| 2,696,802 | 12/1954 | Schmidt | 119/18 |
| 2,936,734 | 5/1960 | Chestnut, Jr. et al | 119/52 R |

*Primary Examiner*—Hugh R. Chamblee
*Attorney, Agent, or Firm*—Clarence A. O'Brien & Harvey B. Jacobson

[57] ABSTRACT

A tubular body is provided and is open at its top and closed at its bottom. A feed access opening is formed in a lower portion of one side wall of the body at an elevation spaced above the closed lower end of the body and an interior partition is provided and extends from the side wall having the feed access opening therein at a point adjacent the upper marginal edge portion of the feed access opening toward the opposite side wall of the tubular body. The partition terminates a spaced distance from the opposite side wall of the body and the marginal edge of the partition adjacent the opposite side wall of the body is spaced above the lower marginal edge portion of the feed access opening in a manner such that the lower marginal edge portion of the feed access opening lies outside the angle of respose of granular material disposed in the closed bottom of the tubular body and extending downwardly toward the one side wall of the body from the marginal edge of the partition adjacent the opposite side wall of the body. Also, the upper open end of the tubular body includes peripherally spaced upstanding bendable tabs whereby the tubular body may be suspended from a wire mesh covering the top of an animal cage by passing a plurality of the bendable tabs upwardly through the openings in the wire mesh and bending the tabs down over the crossed member which define the wire mesh.

5 Claims, 8 Drawing Figures

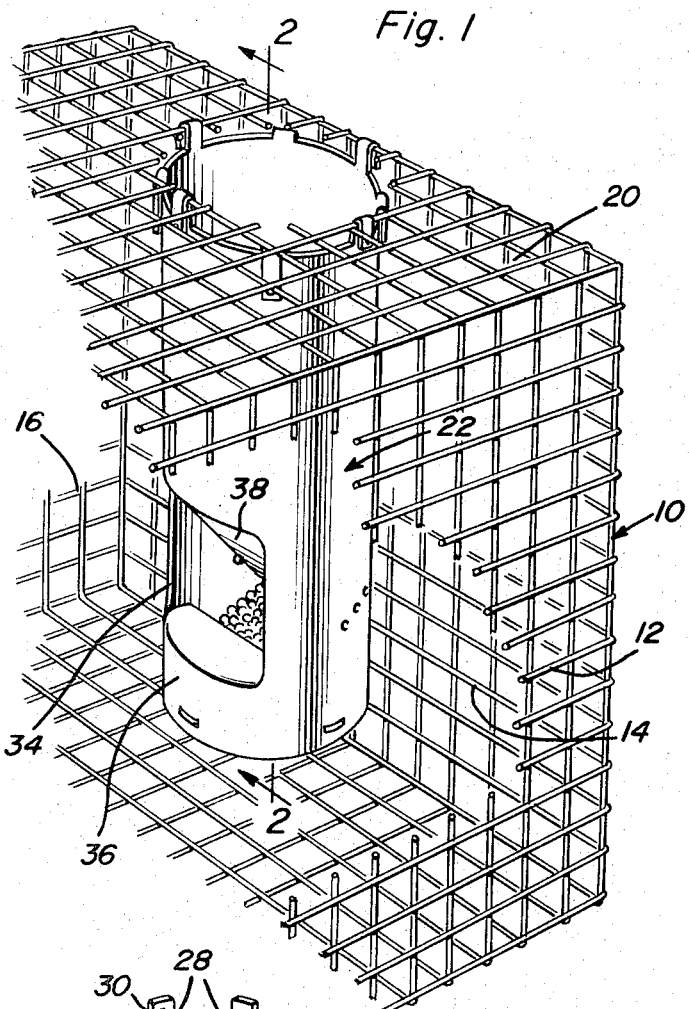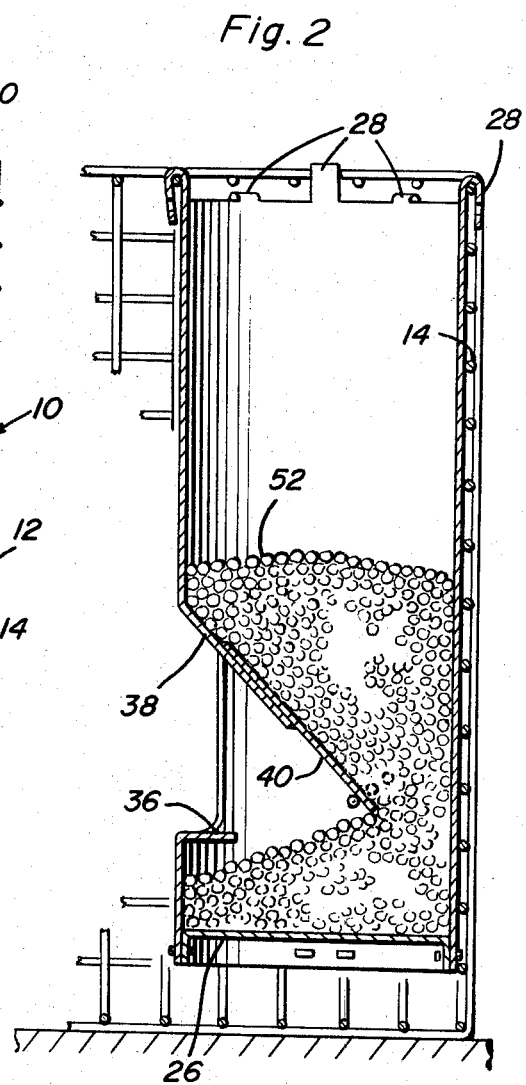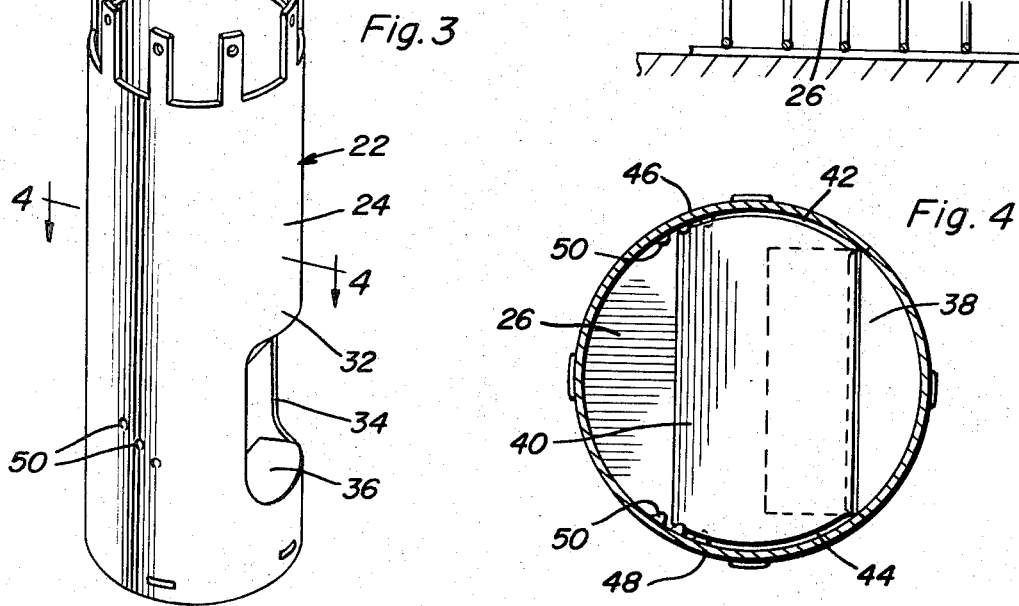

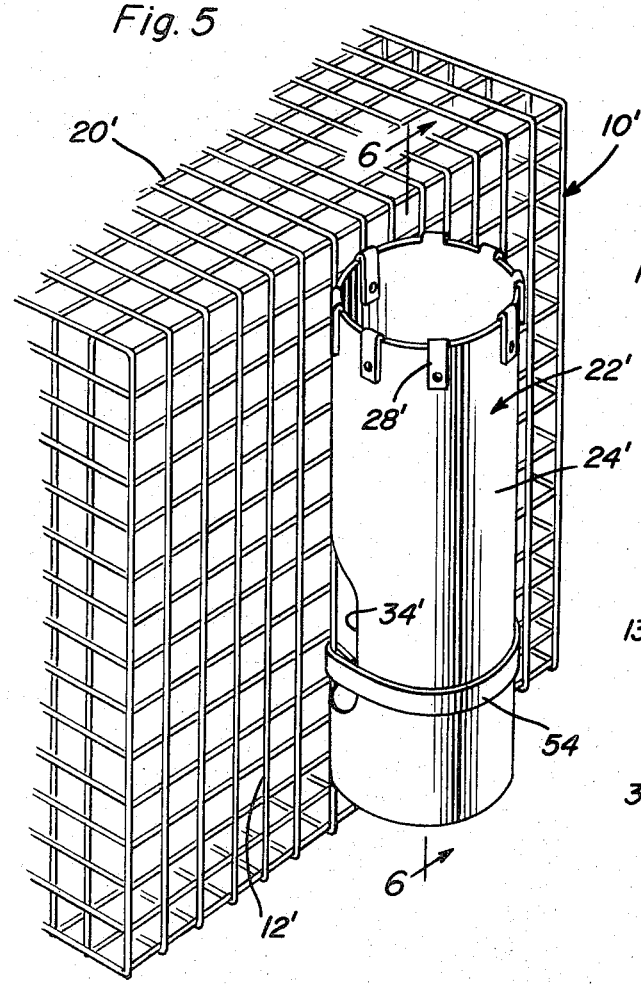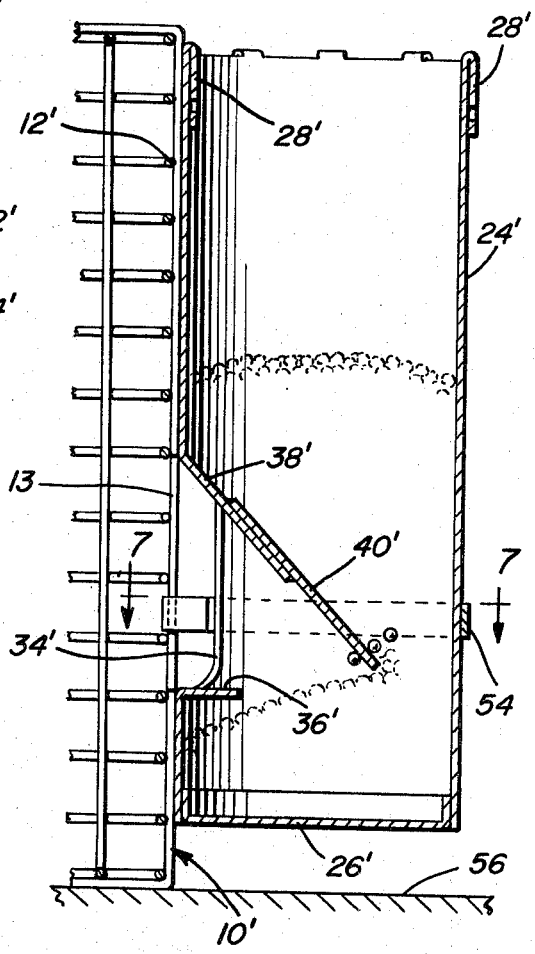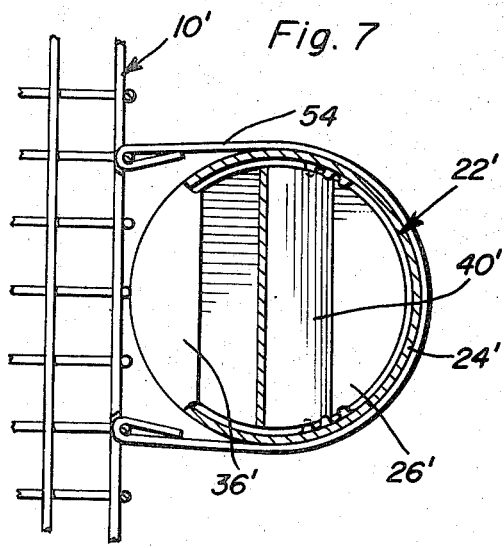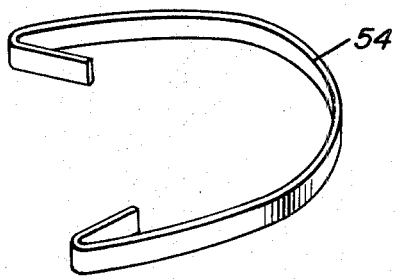

SMALL ANIMAL AND POULTRY FEEDER

The animal feeder of the instant invention has been designed to provide a means whereby granular feed may be stored in a hopper type receptacle providing easy access thereto and including a feed trough portion to which various types of animals or poultry may gain ready access for feeding. The feed has also been designed to enable it to be readily supported in depending fashion from the top of an animal cage or from one side wall portion of the animal cabe having an opening formed therein.

The animal feeder is further constructed in a manner whereby it may be readily manufactured from available material at a low cost and its structural features enable the feeder to be manufactured in various sizes for use in conjunction with various size animal or poultry cages.

The main object of this invention is to provide an animal feeder for support from an animal cage and constructed in a manner whereby animals within the cage may have ready access to the feed trough portion of the feeder.

Another object of this invention is to provide a feeder having a hopper portion thereof and so constructed whereby the supply of feed contained within the hopper portion will be gradually dispensed into the feed trough portion of the feeder as the supply of feed within the feed trough portion is depleted.

Yet another object of this invention is to provide a feeder constructed in a manner whereby it may be readily supported in depending fashion from the top of an animal cage or from one side wall of an animal cage.

A final object of this invention to be specifically enumerated herein is to provide an animal feeder in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 1 is a fragmentary perspective view of an animal cage illustrating the manner in which the feeder of the instant invention may be dependingly supported from the top of the animal cage;

FIG. 2 is an enlarged fragmentary vertical sectional view taken substantially upon the plane indicated by the section line 2—2 of FIG. 1;

FIG. 3 is a perspective view of the feeder;

Fig. 4 is an enlarged horizontal sectional view taken substantially upon a plane indicated by the section line 4—4 of FIG. 3;

FIG. 5 is a fragmentary perspective view of a second animal cage illustrating the manner in which the feeder of the instant invention may be supported from the exterior of one wall of the cage;

FIG. 6 is a vertical sectional view taken substantially upon the plane indicated by the section line 6—6 of FIG. 5;

FIG. 7 is a horizontal sectional view taken substantially upon a plane indicated by the section line 7—7 of FIG. 6; and FIG. 8 is a perspective view of the attaching strap by which the feeder illustrated in FIGS. 6 through 7 is attached to the exterior of the adjacent cage side wall.

Referring now more specifically to the drawings, the numberal 10 generally designates an animal cage including peripheral side walls 12, 14 and 16 interconnected by means of a bottom wall 18 and top wall 20, the non-illustrated side of the cage being closed by a side wall corresponding to the side walls 12, 14 and 16.

The feeder of the instant invention is referred to in general by the reference number 22 and comprises a tubular body 24 of cylindrical configuration. The body 22 has an inverted cup-shaped bottom wall 26 secured in its lower end closing the lower end of the body 24. In addition, the upper marginal edge of the body 24 includes circumferentially spaced upwardly projecting integral, still but bendable tabs 28 apertured as at 30.

One side wall portion 32 of the body 24 has an opening 34 formed therein and the portion of the side wall defining the lower extremity of the opening 34 includes an integral inwardly struck tongue 36. In addition, the portion of the side wall 32 defining the upper extremity of the opening 34 includes an inwardly and downwardly inclined integral tongue 38.

The inner end of the tongue 38 has a planar panel 40 secured thereto and including opposite side arcuate edges 42 and 44 which are closely spaced relative to the opposing inner surfaces of the body 24. The panel 40 may be secured to the tongue 38 as an extension therefor in any convenient manner and the tongue 38 and panel 40 together form an inwardly and downwardly inclined partition.

The side walls 46 and 48 of the body 24 which oppose the arcuate side edges 42 and 44 of the partition 40 include integral inwardly projecting detents 50 and inasmuch as the tongue 38 is at least slightly bendable the angle of the partition defined by the tongue 38 and panel 40 may be varied by engaging the ends of the side edges 42 and 44 of the panel 40 remote from the tongue 38 between selected pairs of detents 50.

With attention now invited more specifically to FIGS. 1 and 2 of the drawings it will be seen that portions of the top wall 20 of the cage 10 have been cut away in order to define a generally circular opening of slightly less diameter than the diameter of the body 24. The body 24 is then positioned beneath the top wall 20 with the tabs 28 projecting upwardly through the openings defined between adjacent crossed members of the top wall 20 and the upper ends of the tabs 28 are then bent outwardly and downwardly over those adjacent portions of the crossed members of the top wall defining the opening formed therein. In this manner, the feeder 22 is dependingly supported from the top wall 20 of the cage 10. Further, in order to provide additional stability to the feeder 22, it is supported from the top wall 20 closely adjacent the side wall 14 of the cage 10. In operation, granular feed 52 is placed within the upper or hopper defining portion of the feeder 22 above the partition defined by the tongue 38 and panel 40 through the open top of the feeder 22 and the opening formed in the top wall 20. The granular feed flows downwardly past the inner free end of the panel 40 and a quantity of the feed 52 is supported from the bottom wall 26. However, it will be noted that the angle of repose of the feed 52 extending forwardly and downwardly from the free marginal edge of the panel 40 falls below the lower marginal edge of the opening 34 and the tongue 36. In this manner, only so much feed as is required to maintain a reasonable supply thereof within the feeder below the panel 48 flows between the free edge of the panel 48 and the side wall of the body 24 abutted against the side wall 14 of the cage 10. Also, as hereinbefore set forth, the inclination of the partition defined by the tongue 38 and panel 40 may be adjusted by causing the free ends of the opposite side edges 42 and 44 of the panel 40 to be frictionally retained between a different pair of detents 50.

With attention now invited more specifically to FIGS. 5 through 8 of the drawings, there will be seen a modified form of cage referred to in general by the reference numeral 10' and a modified form of feeder referred to in general by the reference numeral 22'.

Various portions of the cage 10' and feeder 22' are identical to corresponding portions of the cage 10 and feeder 22. Accordingly, these indentical features have been designated by prime reference numerals corresponding to the reference numerals applied to the indentical features of cage 10 and feeder 22.

The cage 10' differs from the cage 10 in that the side wall 12' has an opening 13 formed therein and in that the top wall 20' of the cage 10' does not have an opening therein corresponding to the opening formed in the top wall 20. In addition, all of the tabs 28' of the feeder 22' have been bent downwardly over the corresponding side wall portions of the body 24' and the body 24' has been positioned on the outside of the side wall 12' with the opening 34' registered with the opening 13 and a stiff but bendable mounting strap 54 being utilized to support the body 24' from the exterior of the side wall 12' above the support surface 56 upon which the cage 10' rests. In addition, the bottom wall 26' of the feeder 22' comprises an upright cup secured in the lower end of the body 24' as opposed to the bottom wall defining inverted cup 26 secured in the lower end of the body 24.

In operation, the feeder 22' is positioned on the exterior of the cage side wall 12' in the manner illustrated in FIGS. 5 and 6 of the drawings and the bendable but stiff strap 54 is then bent into a U-shaped configuration and disposed about the body 24' with the free ends of the strap 54 projecting through adjacent crossed members of the side wall 12' on opposite sides of the opening 13. Then, the free ends of the strap 54 are bent inwardly and back upon themselves in order to attach the strap 54 and body 24' to the side wall 12'. Of course, the operation of the feeder 22' is substantially indentical to the operation of the feeder 22.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A small animal feeder comprising an upstanding tubular body open at its top and closed at its bottom, said tubular body including a first upstanding side wall portion, a feed access opening formed in said first side wall portion of said body adjacent but spaced above the closed end of said body, an interior partition within said body including at least a root end portion formed integrally with and inclined inwardly and downwardly from the portion of said first side wall portion defining the upper extremity of said feed access opening and extending from said first side wall portion inwardly toward but terminating at a point spaced from the inner surface of a lower portion of the opposite wall portion of said body, the marginal edge portion of said partition remote from said one side wall portion and spaced from said opposite wall portion being spaced above the lower marginal edge portion of said opening such that the lower marginal edge portion of said opening lies outside the angle of repose of granular material disposed on the closed bottom of said body and extending downwardly toward said one side wall portion from the marginal edge of said partition remote from said one side wall portion, the lower extremity of said feed access opening being defined by a generally horizontally disposed and inwardly struck integral lower portion of said first side wall portion, the upper marginal edge of the side wall of said tubular body including integral peripherally spaced inwardly projecting and bendable but stiff mounting tabs, said tabs including at least four tabs spaced substantially equally about the periphery of the upper end of said side wall, whereby said body may be readily suspended, by said tabs, from a wire mesh top cover of an animal cage in which said feeder is disposed.

2. The combination of claim 1 wherein at least some of said tabs have apertures formed therethrough, whereby fasteners may be secured through said apertures for support of said feeder from a support in which said fasteners may be secured.

3. A small animal feeder comprising an upstanding tubular body open at its top and closed at its bottom, feed access opening formed in one side wall portion of said body adjacent but spaced above the closed end of said body, an interior partition within said body extending from said one side wall portion toward but terminating at a point spaced from one side wall portion toward but terminating at a point spaced from the inner surface of the opposite wall portion of said body, the marginal portion of said partition adjacent said one wall portion being disposed at an elevation at least equal to the elevation of the uppermost portion of said opening, the marginal edge portion of said partition remote from said one side wall portion and spaced from said opposite wall portion being spaced above the lower marginal edge portion of said opening such that the lower marginal edge portion of said opening lies outside the angle of repose of granular material disposed on the closed bottom of said body and extending downwardly toward said one side wall portion from the marginal edge of said partition remote from said one side wall portion, said tubular body including opposite side wall portions between which said marginal portion of said partition remote from said one side wall portion extends, said opposite side wall portions including rows of spaced inwardly projecting detents between which the opposite ends of the last mentioned marginal portion may be frictionally retained, saidd partition being at least slightly bendable.

4. The combination of claim 3 wherein the marginal edges of the open top of said body include peripherally spaced upwardly projecting bendable but stiff mounting tabs.

5. The combination of claim 4 wherein at least some of said tabs have apertures formed therethrough, whereby fasteners may be secured through said apertures for support of said feeder from a support in which said fasteners may be secured.

* * * * *